(12) United States Patent
Hoot, Jr. et al.

(10) Patent No.: US 7,052,226 B1
(45) Date of Patent: May 30, 2006

(54) WHEELED CONTAINER TRANSFER SELF-ALIGNING PLATFORM FOR MARINE TERMINAL CRANE

(75) Inventors: Joseph E. Hoot, Jr., Media, PA (US); Igor Tirado, Shamong, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 252 days.

(21) Appl. No.: 10/650,662

(22) Filed: Aug. 29, 2003

(51) Int. Cl.
*B63B 27/12* (2006.01)

(52) U.S. Cl. .................................. 414/354; 414/140.3

(58) Field of Classification Search ................ 414/354, 414/359, 360, 576, 584, 140.3, 141.3
See application file for complete search history.

(56) References Cited

U.S. PATENT DOCUMENTS

| | | | |
|---|---|---|---|
| 4,102,273 A | * | 7/1978 | Merkle et al. ................. 104/34 |
| 4,160,617 A | * | 7/1979 | Montgomery et al. ... 414/141.3 |
| 4,293,077 A | * | 10/1981 | Makino ....................... 212/325 |
| 5,142,658 A | * | 8/1992 | McMorran et al. ......... 382/104 |
| 5,509,723 A | * | 4/1996 | Bratlie ......................... 298/18 |
| 5,661,465 A | * | 8/1997 | Hung et al. .............. 340/686.2 |
| 6,375,407 B1 | * | 4/2002 | Coblentz .................... 414/803 |

FOREIGN PATENT DOCUMENTS

JP          11-34729          *  2/1999

* cited by examiner

*Primary Examiner*—Thomas J Brahan
(74) *Attorney, Agent, or Firm*—Jacob Shuster

(57) ABSTRACT

A wheeled platform is positioned between the legs of a marine terminal crane for reception thereon and departure therefrom of a motor truck from which a container is transferred by the crane onto a dockside positioned ship. The container is supported by the platform on tables that are automatically positioned and maintained in operative alignment with the crane spreader bar through which the container is transferred to the crane boom in response to location indicating signals from a sensor grid on the platform.

12 Claims, 3 Drawing Sheets

WHEELED CONTAINER TRANSFER SELF-ALIGNING PLATFORM FOR MARINE TERMINAL CRANE

The present invention relates to the transfer of containers by means of a marine terminal crane to a dockside located ship.

BACKGROUND OF THE INVENTION

Transport of loaded containers between dockside piers and ships currently involve use of a large marine terminal crane, which typically embodies a horizontally elongated boom having a rail guided trolley through which the container is delivered. At large ports such a crane is often a bottleneck when high load transfer performance is required. When container transfer between a truck and a misaligned lowered spreader bar from the crane boom is involved, repeated and time-consuming load transfer attempts are required before spreader bar attachment to the container is achieved.

It is therefore an important object of the present invention to provide for a more efficient and less time-consuming transfer of containers from trucks to ships through the aforementioned type of marine terminal crane.

SUMMARY OF THE INVENTION

In accordance with the present invention, motorized vehicle trucks carrying a containers are driven onto a wheeled platform along a lowered hinge ramp at one entry end of the platform. Each of the trucks with the container thereon is then automatically adjusted to a position on the platform in alignment with a spreader bar lowered from the boom of a marine terminal crane, under directional control of a sensing grid network associated with the platform. After unloading of the container from the truck onto the platform, the truck is driven off the platform along a hinge ramp at the departure end of the platform opposite the truck entry end.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF THE PREFERRED EMBODIMENT

Figure 1:
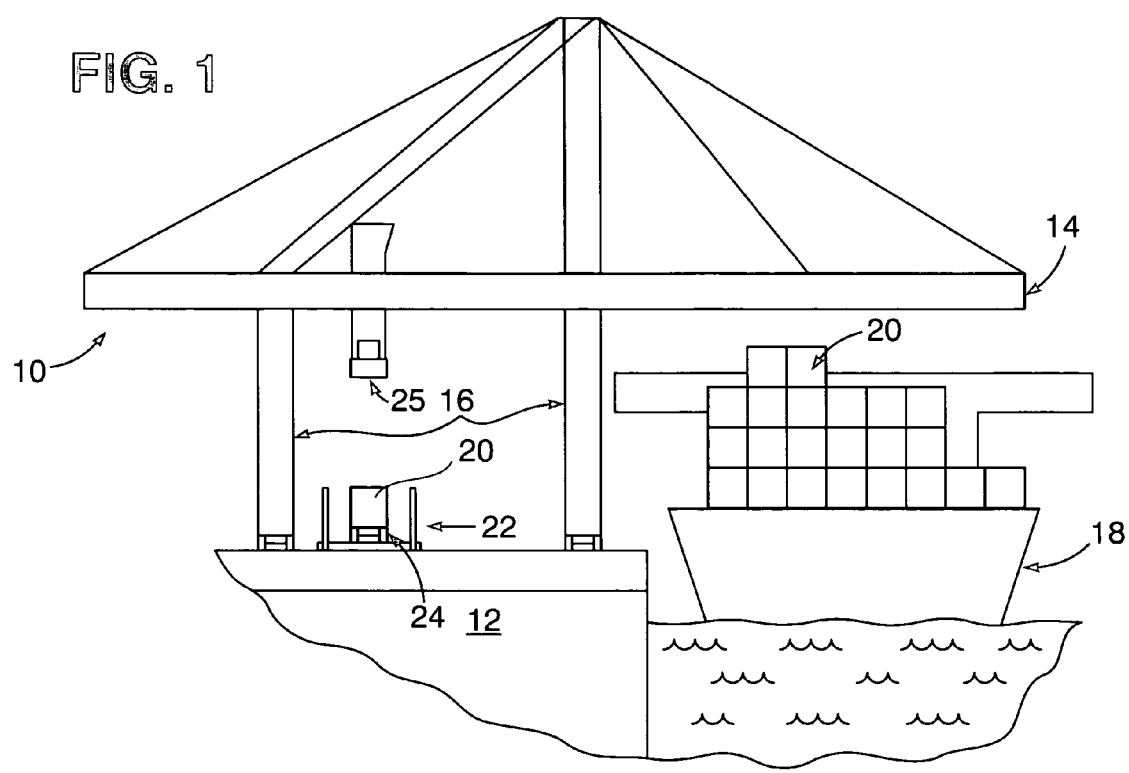
FIG. 1 is a simplified side elevation view of a marine terminal crane at a dockside pier with its boom overlying a dockside located ship to which a container is transferred from a vehicle truck.

Referring now to the drawing in detail, FIG. 1 illustrates a marine terminal crane 10 of a type generally known in the art, mounted on a dockside pier 12. The crane 10 includes a horizontally elongated boom 14 extending from crane gantry legs 16 over a ship 18 located alongside of the pier 12 onto which containers 20 are unloaded from the boom 14. As also shown in FIG. 1, one of the containers 20 is located between the crane gantry legs 16 on the truck 24 that is positioned onto a self-aligning platform 22.

Figure 2:
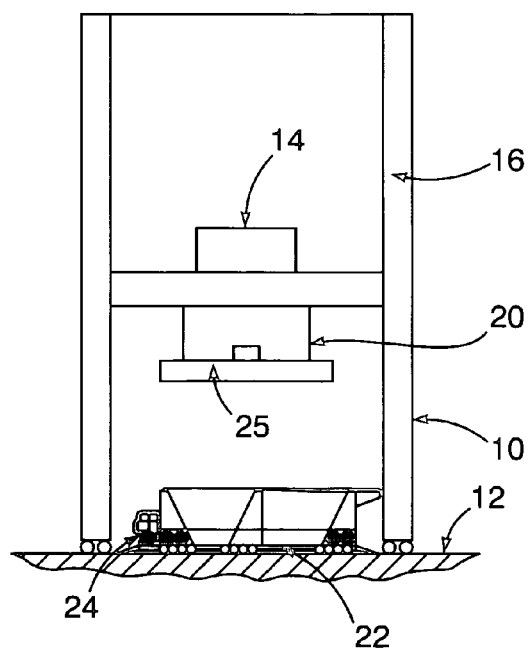
FIG. 2 is a simplified front elevation view of the container transferring crane illustrated in FIG. 1.
Figure 3:
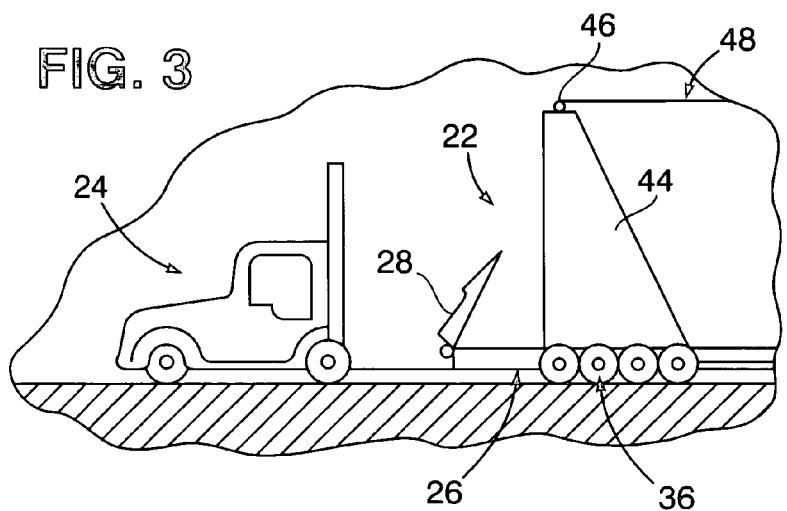
FIG. 3 is a partial side elevation view of a wheeled support platform being towed by a motorized vehicle truck.

The platform 22 is transported to the crane at the pier 12 by the motorized truck vehicle 24 as shown in FIG. 3. Thereafter, the truck 24 with one of the containers 20 thereon is positioned on the platform 22 in alignment with a crane spreader bar 25 so that the container 20 may be lifted onto the boom 14 as shown in FIG. 2.

Figure 4:
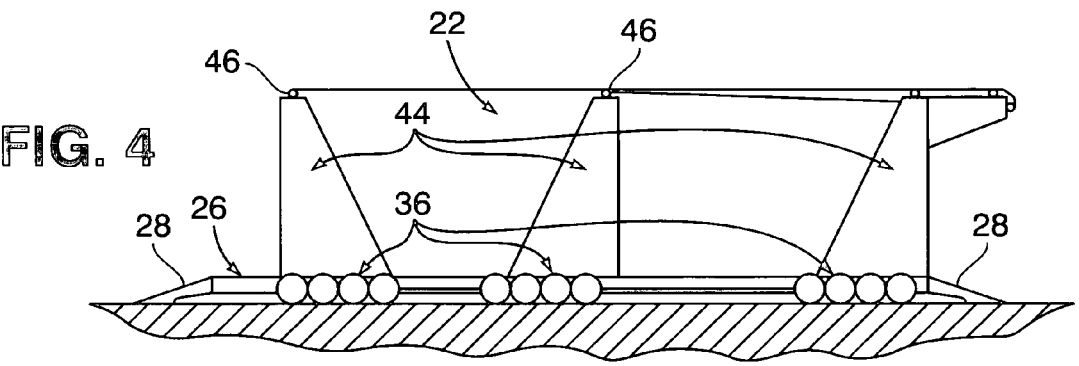
FIG. 4 is a side elevation view of the wheeled platform positioned with hinged ramps at opposite ends in lowered position.
Figure 5:
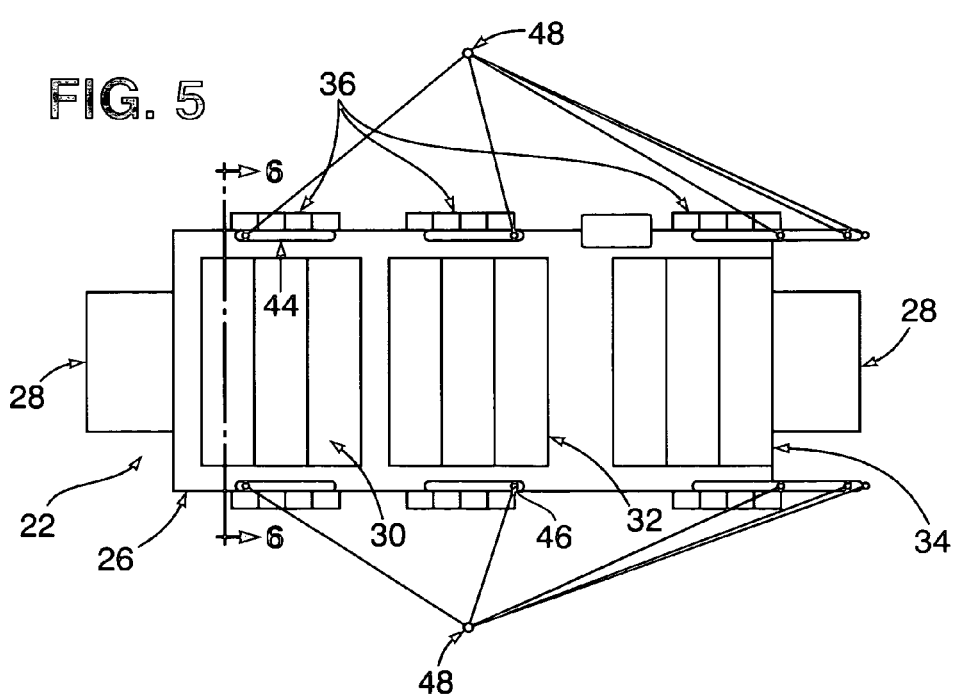
FIG. 5 is a top plan view of the platform shown in FIG. 4.
Figure 6:
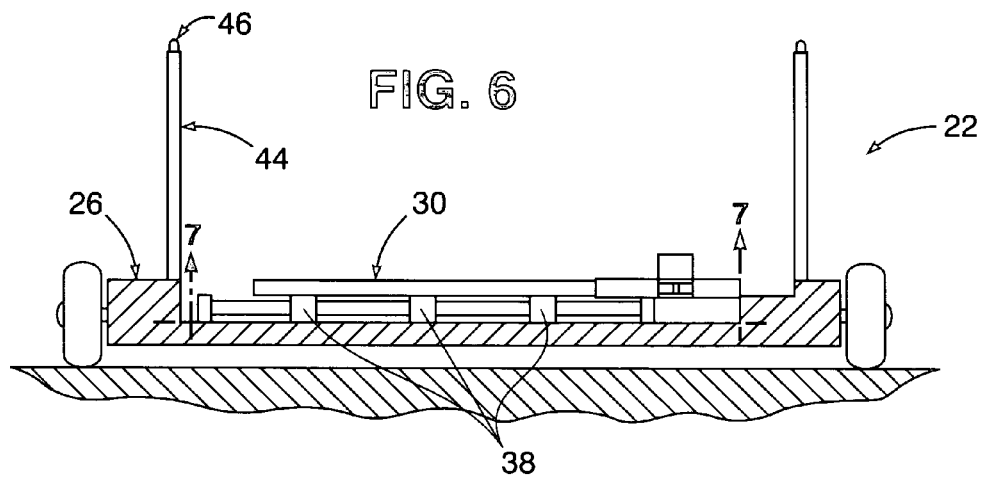
FIG. 6 is a section view taken substantially through plane indicated by section line 6—6 in FIG. 5.

Referring now to FIGS. 3, 4 and 5, the self-aligning platform 22 includes a generally rectangular frame 26 having ramps 28 hinged thereto at opposite ends. The ramp 28 at one end of the platform frame 26 is folded upward as shown in FIG. 3 to accommodate attachment thereof to of the truck 24 for transport of the platform 22 to the pier 12. Both of such ramps 28 are extended outwardly onto the ground as shown in FIG. 4 after the platform 22 is positioned at the pier 12. Three truck reception tables 30, 32 and 34 are positioned in the platform frame 26 as shown in FIG. 5. Each of such tables 30, 32 and 34 is provided with a set of four support wheels 36 on opposite sides thereof to respectively establish a wheeled truck chassis of different sizes such as 20 ft. and 40–45 ft.

Figure 7:
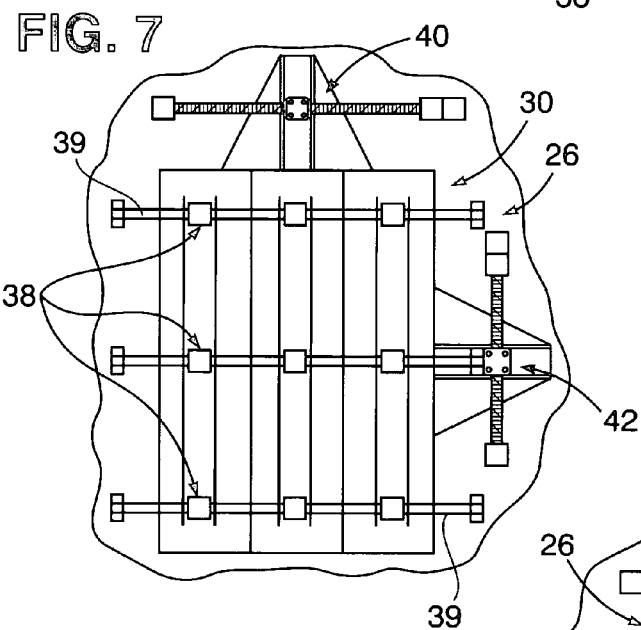
FIG. 7 is a partial section view taken substantially through a plane indicated by section line 7—7 in FIG. 6.
Figure 7A:
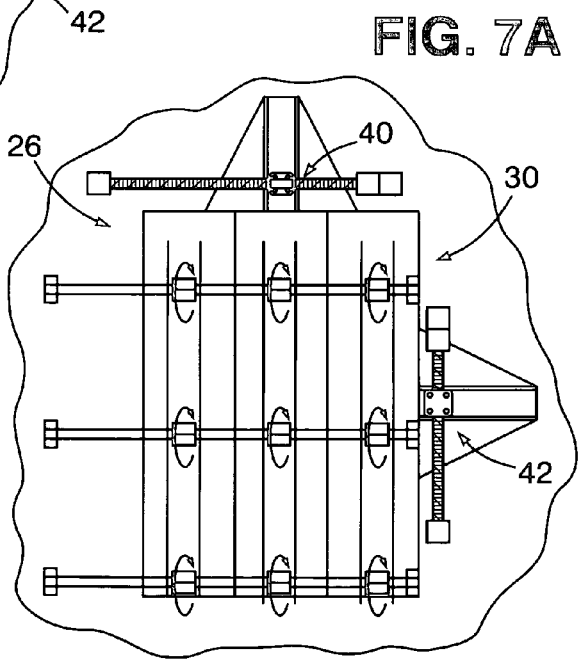
FIG. 7A is a section view corresponding to that of FIG. 7, showing the platform table displaced from the neutral position illustrated in FIG. 7.

Associated with each set of the table supporting wheels 36 on the underside of each of the tables 30, 32 and 34 as shown in FIG. 5, are linear rotary bearing assemblies 38 as shown in FIG. 7 which are slidable along and rotatable on fixed shafts 39 mounted on the platform support frame 26. Also provided on the support flame 26 is a pair of ball screw drive systems 40 and 42 extending therefrom at right angle to each other as shown in FIG. 7. Thus, as shown in FIG. 7A, the tables 30, 32 and 34 may be displaced relative to each other in two 90° related directions from its central neutral position to a limited extent. The tables 30, 32 and 34 may accordingly be adjustably repositioned while on the pier 12 in 90° related directions into alignment with the crane spreader bar 25 while providing a bearing supported surface thereon for the container 20 to be transferred therefrom onto the crane boom 14.

Also provided on the opposite sides of the platform frame 26 at the locations of the support wheels 36 are pairs of vertically extending laterally spaced pairs of triangular plates 44 having sensor elements 46 mounted at the upper ends thereof and operationally interconnected as diagrammed in FIG. 5 to form sensing grid or arrays 48 for locationally positioning of the platform table 30, 32 or 34 with the truck 24 and the container 20 thereon so as to maintain the same aligned position of the platform table 30, 32 or 34 relative to the crane spreader bar 25 regardless of the prior initial positioning of the platform 22 by the truck 24. Transfer of the container 20 between the platform 22 and the crane boom 14 is thereby accommodated.

In view of the foregoing described arrangement, the platform 22 may be moved into position between the legs 16 of the crane 10 by the truck 24 which is then disengaged therefrom. Another one of the trucks 24 with the container 20 thereon may then drive up one of the ramps 28 onto the previously positioned platform 22 as shown in FIGS. 1 and 2. Through the sensor grid 48, the upper corners of the container 20 are located to provide signals for control of the drive systems 40 and 42 so as to optimize positioning ech of the platform tables 30, 32 and 34 by displacement in the two 90° related directions in order to align the container 20 with the spreader bar 25 for lifting thereof from the platform 22, followed by the truck 24 being driven off the platform ramp 28 at the platform departure end, opposite the approach end. The tables 30, 32 and 34 may then be realigned through the drive systems 40 and 42 to the initial neutral position before another container loaded truck 24 drives onto the platform 22 to begin another repeated container transfer process with enhanced efficiency and reliability.

As a result of the foregoing described platform 22 with associated components such as the directionally aligned tables 30, 32 and 34 with the directional drive systems 40 and 42 and the sensing control grid 48, drivers of trucks 24 require less skill and maneuvering activity. Also since downward movement of the crane spreader bar 25 to only one position is required because of the automatic alignment table positioning control provided, so that the requirement for crane operator skill and operator fatigue are reduced.

Obviously, other modifications and variations of the present invention may be possible in light of the foregoing teachings. It is therefore to be understood that within the scope of the appended claims the invention may be practiced otherwise than as specifically described.

What is claimed is:

1. For use with a marine terminal crane at a dockside pier, a system for transferring loaded containers to a ship alongside of said dockside pier by use of motorized vehicles comprising:
    a platform positioned on the dockside pier in underlying relation to the crane onto which a container is transported by a motorized vehicle;
    unitary reception means on the platform for receiving and adjusting a position of the vehicle with the container thereon relative to the platform so as to maintain an aligned position with the crane;
    positioning means for displacement of the unitary reception means relative to the platform in two 90° related directions; and
    sensing means mounted on the platform for detecting a position of the container relative to the platform and directionally controlling said displacement of the unitary reception means with the vehicle with the container thereon to maintain the aligned position with the crane to accommodate said transferring of the container by the crane from the platform to the ship.

2. The system as defined in claim 1, including: a wheeled frame on which the unitary reception means is mounted; and ramp means hingedly connected to the frame for drive on of the vehicle with the container onto the platform and departure with the container unloaded therefrom.

3. The system as defined in claim 2, wherein said positioning means includes: pairs of ball screw drive devices connected to the unitary reception means to impart said displacement thereto in the two 90° related directions.

4. The system as defined in claim 3, wherein said sensing means includes: laterally spaced pairs of support plates fixed to the frame; and sensor elements mounted on said plates and interconnected to form a sensing grid operatively connected to the ball screw drive devices through which detection of said movement of the container is effected.

5. The system as defined in claim 1, wherein said sensing means includes: laterally spaced pairs of support plates; and sensor elements mounted on said plates and interconnected to form a sensing grid through which detection of said movement of the container is effected.

6. The system as defined in claim 1, wherein said positioning means includes: pairs of ball screw drive devices connected to the unitary reception means to impart said displacement thereto in the two 90° related directions.

7. The system as defined in claim 6, wherein said sensing means includes: laterally spaced pairs of support plates; and sensor elements mounted on said plates and interconnected to form a sensing grid connected to the ball screw drive devices through which detection of said movement of the container is effected.

8. The system as defined in claim 1 wherein the platform comprises a transportable wheeled platform and the platform is independent of the crane.

9. The system as defined in claim 1 wherein the reception means comprises a unitary table.

10. A system for transferring shipping containers comprising:
    a platform positioned underneath a marine terminal crane and configured to receive a motorized vehicle transporting a container on an upper surface of the platform;
    a first movable unitary table on the upper surf-ace of the platform configured to receive a first portion of the vehicle and adjust a position of the vehicle relative to the platform so as to maintain an aligned position with the crane,
    a first drive system connected to the first table configured to displace the first table relative to the platform in two orthogonal directions; and
    a sensor mounted on the platform configured to detect a position of the container relative to the platform and control the displacement by the first drive system of the first table to maintain the aligned position with the crane to accommodate transfer of the container from the platform to the crane.

11. The system of claim 10 further comprising:
    a second movable unitary table on the upper surface of the platform configured to receive
    a second portion of the vehicle and adjust a position of the vehicle relative to the platform so as to maintain an aligned position with the crane,
    a second drive system connected to the second table configured to displace the second table relative to the platform in two orthogonal directions; and
    wherein the sensor is configured to control the displacement by the second drive system of the second table to maintain the aligned position with the crane to accommodate transfer of the container from the platform to the crane.

12. The system of claim 11 wherein the platform comprises a transportable wheeled platform and the platform is independent of the crane.

* * * * *